United States Patent
Zsunkan et al.

(10) Patent No.: US 11,725,519 B2
(45) Date of Patent: Aug. 15, 2023

(54) PLATFORM FOR AN AIRFOIL OF A GAS TURBINE ENGINE

(71) Applicant: Raytheon Technologies Corporation, Farmington, CT (US)

(72) Inventors: Matthew R. Zsunkan, Hartford, CT (US); Arun K. Theertham, Rocky Hill, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/187,925

(22) Filed: Mar. 1, 2021

(65) Prior Publication Data
US 2022/0275727 A1    Sep. 1, 2022

(51) Int. Cl.
| F01D 5/14 | (2006.01) |
| F01D 5/28 | (2006.01) |
| F01D 5/30 | (2006.01) |
| F01D 5/06 | (2006.01) |

(52) U.S. Cl.
CPC ............. *F01D 5/147* (2013.01); *F01D 5/066* (2013.01); *F01D 5/282* (2013.01); *F01D 5/3053* (2013.01); *F05D 2220/323* (2013.01); *F05D 2220/36* (2013.01); *F05D 2240/80* (2013.01); *F05D 2300/6034* (2013.01)

(58) Field of Classification Search
CPC .......... F01D 5/143; F01D 5/147; F01D 5/066; F01D 5/282; F01D 5/3023; F01D 5/3053; F01D 11/08
See application file for complete search history.

(56) References Cited

U.S. PATENT DOCUMENTS

| 5,074,753 A | * | 12/1991 | Covington | F01D 5/147 416/223 R |
| 5,240,377 A | * | 8/1993 | Farr | F01D 5/282 416/229 R |
| 10,180,071 B2 | * | 1/2019 | Freeman | F01D 5/284 |
| 10,557,361 B1 | * | 2/2020 | Karkos | F01D 5/147 |

(Continued)

FOREIGN PATENT DOCUMENTS

| EP | 2727711 | 5/2014 |
| EP | 3121386 | 1/2017 |
| EP | 3677749 | 7/2020 |

OTHER PUBLICATIONS

Extended European Search Report for EP Application No. 22159541.6 dated May 27, 2022.

*Primary Examiner* — Topaz L. Elliott
*Assistant Examiner* — Cameron A Corday
(74) *Attorney, Agent, or Firm* — Carlson, Gaskey & Olds, P.C.

(57) ABSTRACT

An assembly for a gas turbine engine includes an airfoil that includes an airfoil section that extends from a root section. The airfoil section extends between a leading edge and a trailing edge in a chordwise direction and extends between a tip portion and the root section in a radial direction. The airfoil section defines a pressure side and a suction side separated in a thickness direction. A platform is dimensioned to receive a retention pin to mount the platform to a rotatable hub. The platform includes a plurality of composite layers that define an internal cavity. A filler includes a stacked composite structure in the internal cavity that extends between the plurality of composite layers.

16 Claims, 5 Drawing Sheets

(56) References Cited

U.S. PATENT DOCUMENTS

| | | |
|---|---|---|
| 10,774,653 B2 | 9/2020 | Theertham |
| 2003/0044570 A1 | 3/2003 | George |
| 2012/0301317 A1* | 11/2012 | Alvanos ................ F01D 25/246 |
| | | 416/241 B |
| 2015/0231849 A1 | 8/2015 | Chapman |
| 2020/0248570 A1 | 8/2020 | Lyders et al. |
| 2021/0003016 A1 | 1/2021 | Theertham |

\* cited by examiner

PLATFORM FOR AN AIRFOIL OF A GAS TURBINE ENGINE

BACKGROUND

This disclosure relates to a gas turbine engine, and more particularly to a rotor assembly including composite components.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

The gas turbine engine may include composite components formed from by ply layers. The ply layers may be arranged to define one or more voids or cavities. Fillers may be placed in the cavities and may be dimensioned to have a complementary geometry with the adjacent ply layers.

SUMMARY

In one exemplary embodiment, an assembly for a gas turbine engine includes an airfoil that includes an airfoil section that extends from a root section. The airfoil section extends between a leading edge and a trailing edge in a chordwise direction and extends between a tip portion and the root section in a radial direction. The airfoil section defines a pressure side and a suction side separated in a thickness direction. A platform is dimensioned to receive a retention pin to mount the platform to a rotatable hub. The platform includes a plurality of composite layers that define an internal cavity. A filler includes a stacked composite structure in the internal cavity that extends between the plurality of composite layers.

In a further embodiment of any of the above, the stacked composite structure in the filler includes multitude composite layers arranged in parallel planes.

In a further embodiment of any of the above, the multitude of composite layers of the stacked composite structure are surrounded by an overwrap ply.

In a further embodiment of any of the above, the overwrap ply is bonded to lateral edges of the multitude of composite layers of the stacked composite structure.

In a further embodiment of any of the above, the overwrap ply includes a single layer defining a butt joint that a discontinuity in the overwrap ply to form an opening to the stacked composite structure.

In a further embodiment of any of the above, the multitude of composite layers are formed from discontinuous fiber material sheets.

In a further embodiment of any of the above, the composite layers include bond lines between adjacent sheet segments.

In a further embodiment of any of the above, the platform includes a bushing in the internal cavity. The bushing is dimensioned to receive the retention pin. The stacked composite structure directly engages the bushing to transfer loads to the plurality of composite layers that bound the internal cavity.

In a further embodiment of any of the above, the plurality of composite layers include first and second sets of ply layers that define an outer periphery of the platform. A third set of ply layers are included that abut against the first and second sets of ply layers to surround a hollow cavity.

In a further embodiment of any of the above, the plurality of composite layers are arranged such that a cross section of the internal cavity has a deltoid shaped geometry. The internal cavity is defined in the root section. The stacked composite structure is machined to accept a bushing. A perimeter of the internal cavity tapers towards the tip portion.

In another exemplary embodiment, a platform for a gas turbine engine includes a platform body that defines one or more slots between a plurality of flanges. The one or more slots are dimensioned to receive a respective flange of a hub. The platform body includes a plurality of composite layers that join together to define an internal cavity. A filler includes a stacked structure that has a multitude of composite layers in the internal cavity. The filler extends between the plurality of composite layers.

In a further embodiment of any of the above, the multitude of composite layers of the stacked composite structure are formed from discontinuous fiber material sheets.

In a further embodiment of any of the above, the plurality of composite layers in the stacked composite structure are arranged in parallel planes. The multitude of composite layers are surrounded by an overwrap ply. The overwrap ply is bonded to the multitude of composite layers and follows a contour of the internal cavity on a first side and abuts the stacked composite structure on a second opposite side. The overwrap play includes a single layer defining a butt joint that a discontinuity in the overwrap ply to form an opening to the stacked composite structure.

In a further embodiment of any of the above, the platform includes a bushing in the internal cavity. The bushing is dimensioned to receive a retention pin. The stacked composite structure directly engages the bushing to transfer loads to the plurality of composite layers that bound the internal cavity.

In a further embodiment of any of the above, the plurality of composite layers include first, second and third sets of ply layers. The first set of ply layers define a platform base dimensioned to extend between adjacent airfoils. The second set of ply layers extend from the first set of ply layers to define the plurality of flanges. The third set of ply layers abut against the first and second layers to surround a passage that extends through the plurality of flanges.

In another exemplary embodiment, a gas turbine engine includes a fan section and a compressor section. A turbine section drives the fan section and the compressor section. A rotor assembly includes a hub rotatable about an engine longitudinal axis. The hub includes a plurality of flanges. An array of airfoils circumferentially distributed about an outer periphery of the hub. Each one of the airfoils include an airfoil section that extends from a root section mounted to the hub. An array of platforms are mechanically attached to the hub. Each of the platforms include one or more slots defined by a plurality of flanges. The one or more slots are dimensioned to receive a respective one of the flanges of the hub. There is a plurality of retention pins. Each one of the retention pins extend through the flanges of the hub and through the plurality of flanges of a respective one of the platforms to mechanically attach the respective one of the platforms to the hub. A plurality of fillers each include a stacked composite structure in a corresponding one of a plurality of internal cavities in a respective one of the platforms. Each of the internal cavities bounded by one or more composite layers.

In a further embodiment of any of the above, the stacked composite structure includes a multitude of composite layers formed from discontinuous fiber material sheets.

In a further embodiment of any of the above, at least one of the airfoil section and the root section comprises the one or more composite layers that define a respective one of the internal cavities.

In a further embodiment of any of the above, the multitude of composite layers of the stacked composite structure are surrounded by an overwrap ply.

In a further embodiment of any of the above, the overwrap ply is bonded to lateral edges of the multitude of composite layers of the stacked composite structure and the overwrap ply includes a single layer defining a butt joint with a discontinuity in the overwrap ply to form an opening to the stacked composite structure.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
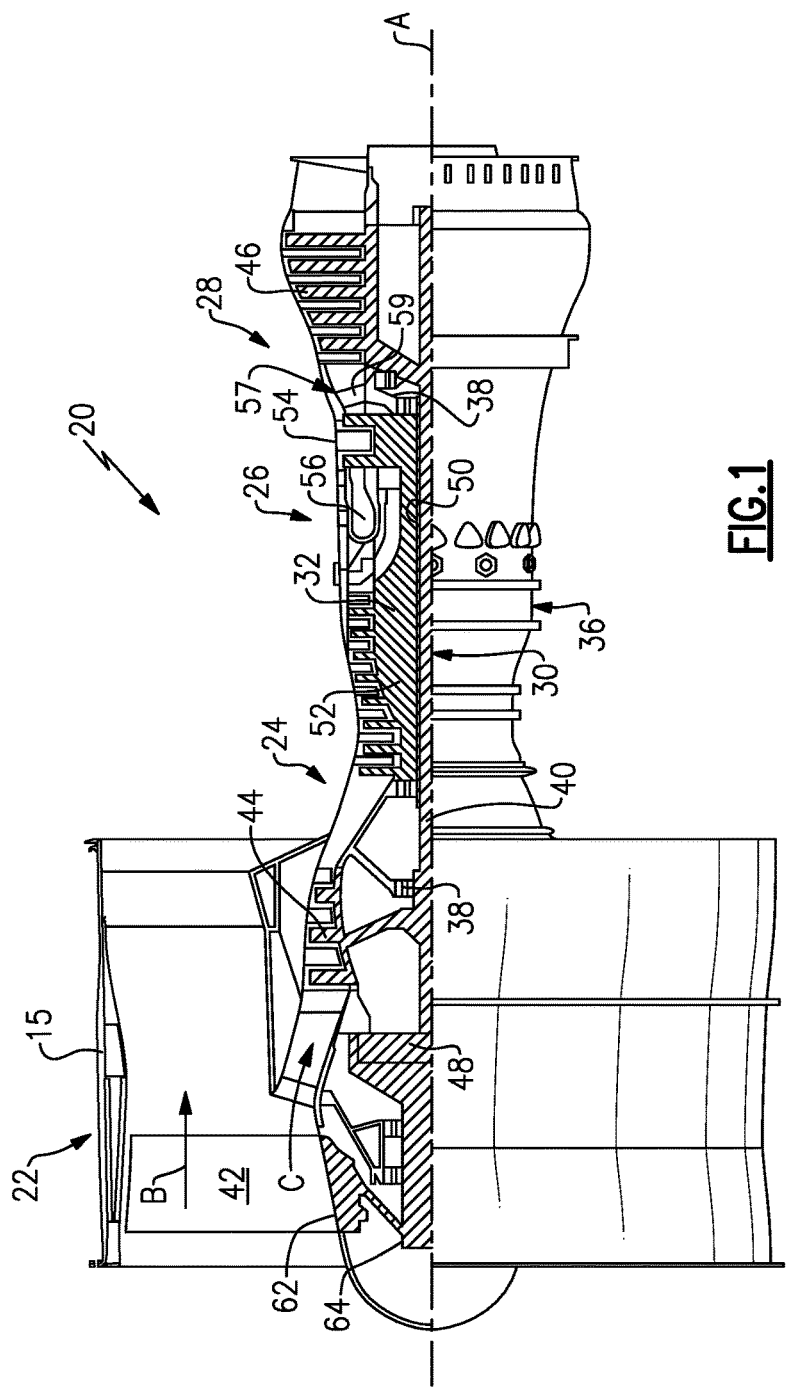
FIG. 1 is a schematic view of an example gas turbine engine according to a non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15, such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7 ° R)]$^{0.5}$. The "Low corrected fan tip speed" as disclosed herein according to one non-limiting embodiment is less than about 1150 ft/second (350.5 meters/second).

Figure 2:
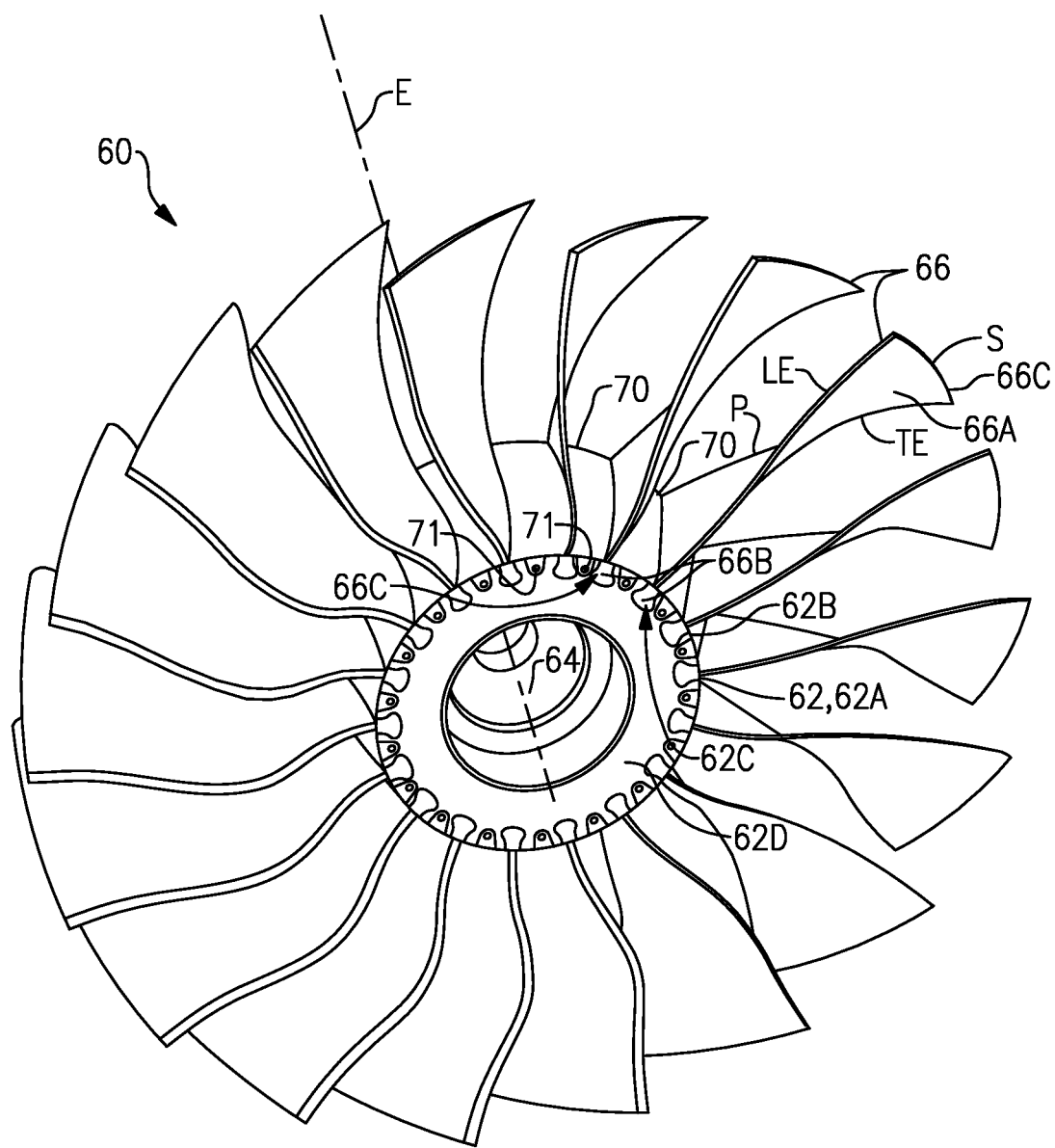
FIG. 2 illustrates a perspective view of an example rotor assembly including an array of airfoils distributed about a longitudinal axis.

FIG. 2 illustrates a rotor assembly 60 for the gas turbine engine 20. The rotor assembly 60 can be incorporated as the fan 42 into the fan section 22 of FIG. 1, for example. However, it should to be understood that other portions of the gas turbine engine 20, such as fan case 15, other portions of the engine static structure 36, and airfoils including static vanes in the compressor section 24, and other systems may benefit from the teachings disclosed herein, such as a multi-stage fan or a land-based turbine.

The rotor assembly 60 includes a rotatable hub 62 mechanically attached or otherwise mounted to a fan shaft 64. The rotatable hub 62 includes a main body 62A that extends along the longitudinal axis E. The longitudinal axis E can be parallel to or collinear with the engine longitudinal axis A of FIG. 1. The fan shaft 64 and hub 62 are rotatable about the longitudinal axis E. The fan shaft 64 can be rotatably coupled to the low pressure turbine 46, as illustrated in FIG. 1, for example.

The rotor assembly 60 includes an array of airfoils 66 circumferentially distributed about and carried by an outer periphery 62B of the rotatable hub 62. Each airfoil 66 includes an airfoil section 66A extending from a root section 66B. The hub 62 includes a plurality of retention slots 62C that extend inwardly from the outer periphery 62B of the hub 62. Each root section 66B is slideably received in a respective one of the retention slots 62C to mechanically attach or otherwise secure the airfoil 66 to the hub 62. The root section 66B can have a dovetail geometry that mates with a contour of the respective retention slot 62C (also shown in dashed lines in FIG. 3 for illustrative purposes).

The rotor assembly 60 includes an array of platforms 70. In the illustrative example of FIG. 2, the platforms 70 are separate and distinct from the airfoils 66. In other examples, the platforms 70 are integrally formed with one or more of the airfoils 66. The platforms 70 are circumferentially distributed about the outer periphery 62B of the hub 62. The platforms 70 are situated between and abut against adjacent pairs of airfoils 66 to define an inner boundary of a gas path along the rotor assembly 60, as illustrated in FIG. 2. The platforms 70 are dimensioned to support the adjacent airfoils 66 and limit or otherwise oppose circumferential movement of the airfoils 66 during engine operation. The rotor assembly 60 includes a plurality of retention pins 71. Each platform 70 can be mechanically attached or otherwise secured to the hub 62 with a respective one of the retention pins 71.

Figure 3:
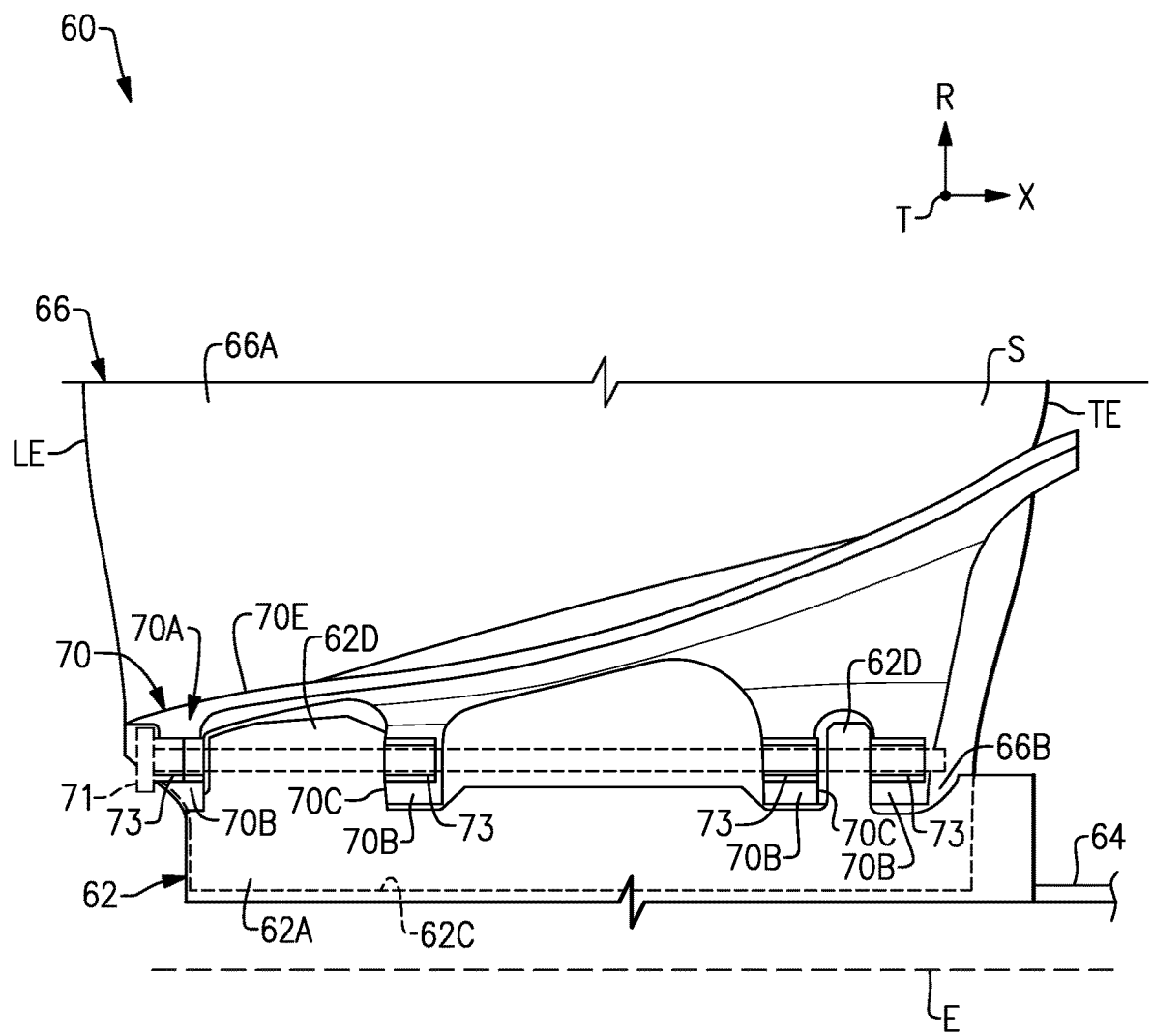
FIG. 3 illustrates a cross-sectional view of the rotor assembly along the longitudinal axis of FIG. 2 including one of the array of airfoils secured to a platform.

Referring to FIG. 3, with continuing reference to FIG. 2, one of the airfoils 66 and platforms 70 mounted to the hub 62 is shown for illustrative purposes. The airfoil section 66A extends between a leading edge LE and a trailing edge TE in a chordwise direction X, and extends in a radial direction R between the root section 66B and a tip portion 66C (FIG. 2) to provide an aerodynamic surface. The tip portion 66C defines a terminal end or radially outermost extent of the airfoil 66 to establish a clearance gap with fan case 15 (FIG. 1). The airfoil section 66A defines a pressure side P (FIG. 2) and a suction side S separated in a thickness direction T.

Each platform 70 includes a platform body 70A including a plurality of axially spaced apart flanges 70B. The platform body 70A includes a platform base 70E dimensioned to abut against and extend along the airfoil section 66A of adjacent airfoils 66. The platform base 70E defines an aerodynamic contour and gas path surface between the adjacent airfoils 66. The platform body 70A defines one or more slots 70C between the flanges 70B. Each slot 70C is dimensioned to receive a respective flange 62D of the hub 62. Each flange 62D can have an annular geometry that extends circumferentially about the longitudinal axis E, as illustrated by FIG. 2.

Each platform 70 is dimensioned to receive at least one retention pin 71 (shown in dashed lines in FIG. 3) to mechanically attach and mount the platform 70 to the hub 62. Each of the flanges 70B can include a respective platform bushing 73. The bushings 73 can be axially aligned and dimensioned to slideably receive a common one of the retention pins 71, as illustrated by FIG. 3. Each retention pin 71 is dimensioned to extend through the flanges 62D of the hub 62 and through the flanges 70B of the respective platform 70 to mechanically attach the platform 70 to the hub 62.

The rotor assembly 60 can include one or more composite components, such as the airfoils 66 and/or platforms 70. Example composite materials include thermoplastics and ceramics such as ceramic matrix composites (CMC) having one or more ply layers or fibers in a resin matrix.

The rotor assembly 60 can include one or more internal cavities defined in the composite components. The composite components may be constructed from a layup of plies, for example. Contouring of the component may cause the plies to define the internal cavities. The internal cavities can be at least partially filled or occupied with material utilizing the techniques disclosed herein to improve fabrication and structural support of the component.

Figure 4:
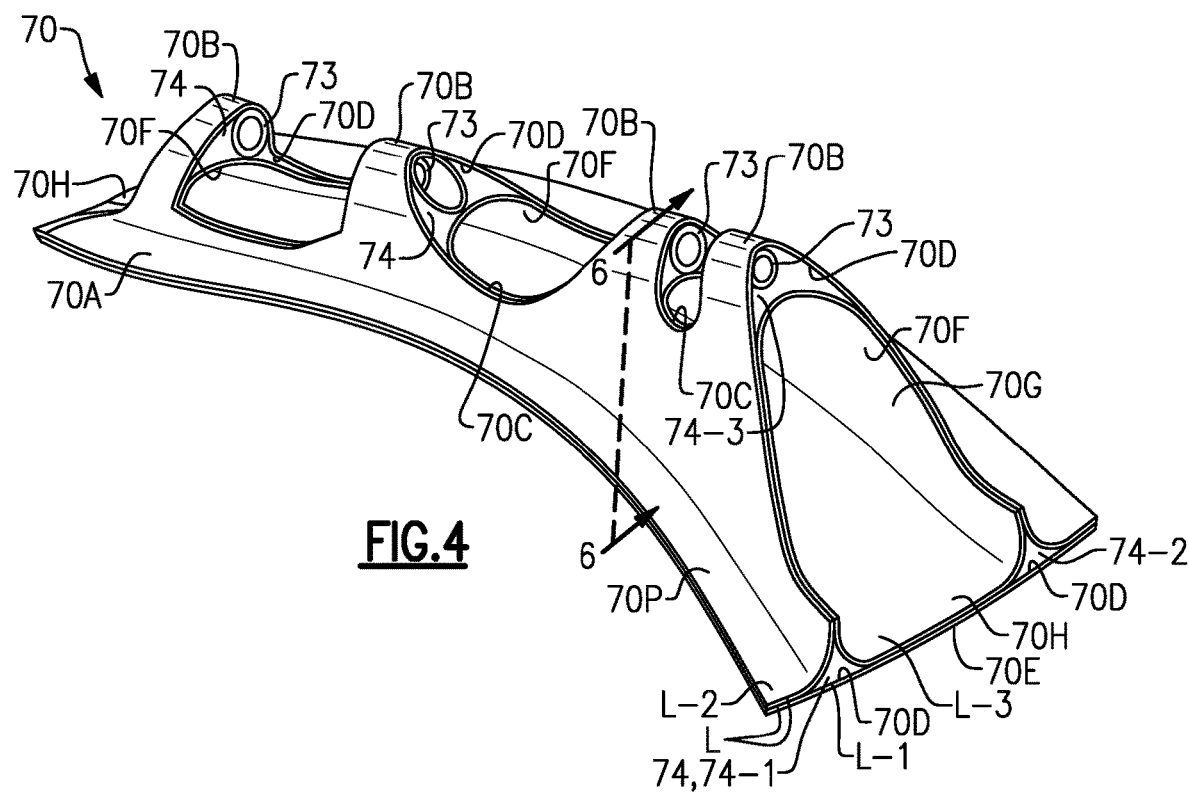
FIG. 4 illustrates a perspective view of the platform of FIG. 3.

Referring to FIG. 4, with continuing reference to FIG. 3, a perspective view of one of the platforms 70 is shown. The platform 70 is a composite structure including a plurality of composite layers L shaped to a predetermined geometry. The composite layers L define the platform body 70A and flanges 70B.

Various materials can be utilized to construct the composite layers L. Example materials include one or more plies of uni-tape, braided yarns, fabric, and two-dimensional or three-dimensional woven fibers, for example. It should be appreciated that uni-tape plies include a plurality of fibers oriented in the same direction ("uni-directional), and fabric includes woven or interlaced fibers, each known in the art. Example fiber constructions include carbon fibers, fiberglass, Kevlar®, a ceramic such as Nextel™, a polyethylene such as Spectra®, and/or a combination of fibers.

The composite layers L include first and second sets of ply layers L-1, L-2 that define an outer periphery 70P of the platform 70. The first set of ply layers L-1 define the platform base 70E. The second set of ply layers L-2 extend from the first set of ply layers L-1 to define the flanges 70B. The composite layers L are arranged such that the flanges 70B form respective arches that extend outwardly from the platform base 70E to define respective hollow cavities 70F.

The composite layers L include a third set of ply layers L-3 that abut against the first and second sets of ply layers L-1, L-2 to surround the hollow cavities 70F.

Figure 6:
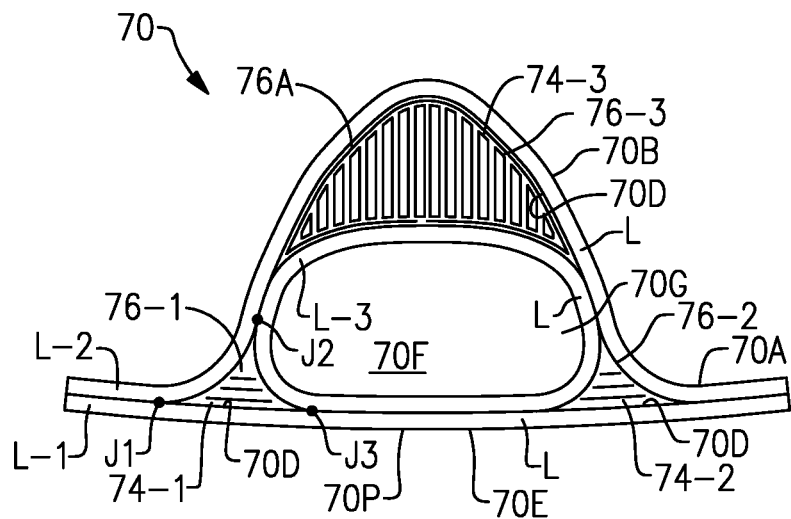
FIG. 6 illustrates a sectional view of the platform taken along line 6-6 of FIG. 4.
Figure 7:
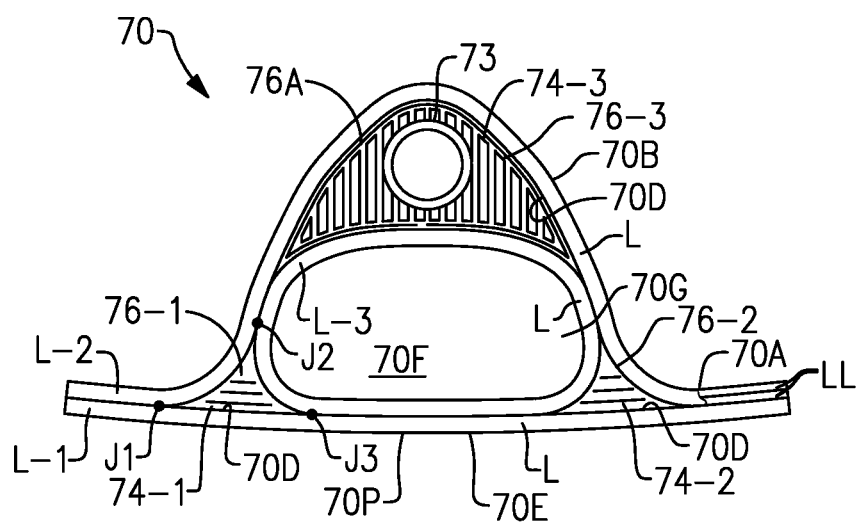
FIG. 7 illustrates a cross-sectional view of the platform taken along line 6-6 with a bushing.

The hollow cavities 70F can be arranged to define portions of an elongated passage 70G. The passage 70G is at least partially surrounded by the third set of ply layers L-3 and extends longitudinally between opposed end portions 70H of the platform body 70A and through each of the flanges 70B, as illustrated by FIGS. 4 and 6. Each composite layer L can include one or more sublayers LL, as illustrated by FIGS. 7 and 8.

The composite layers L can be dimensioned and formed to follow a contour of the platform 70. At least some of the composite layers L are joined together to define one or more of the internal cavities 70D. At least some of the internal cavities 70D are bounded by the platform base 70E and are defined in the flanges 70B. Each cavity 70D is at least partially enclosed by adjacent composite layers L and can be provided with one or more openings to an exterior of the platform 70.

Each platform 70 can include one or more support members or fillers 74 received in a respective cavity 70D. The fillers 74 are dimensioned to complement a geometry of a respective one of the inner cavities 70D and serve to at least partially support the adjacent composite layers L during fabrication. The fillers 74 can also serve as structural members to support the composite layers L during engine operation.

Figure 5:
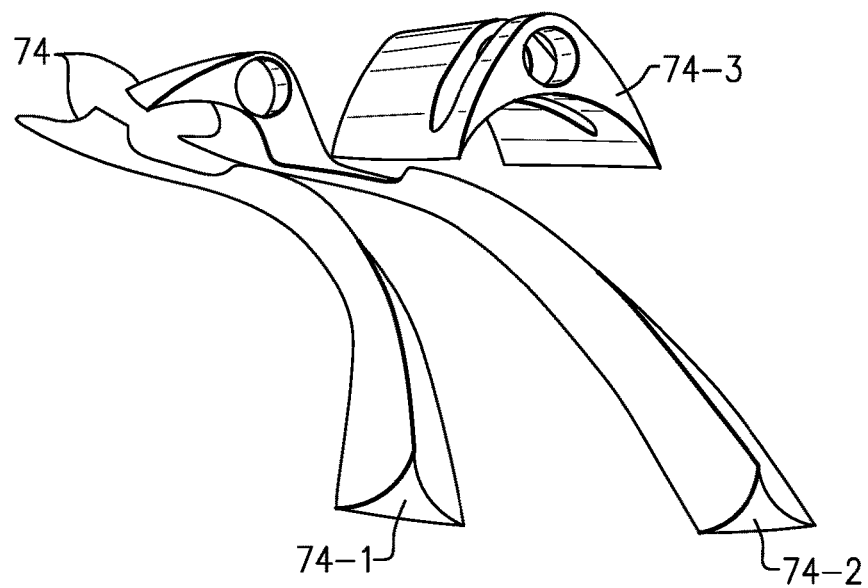
FIG. 5 illustrates an isolated view of example fillers from the platform of FIG. 4.

In the illustrated example of FIG. 4, the platform 70 includes first and second fillers 74-1, 74-2 that extend along the platform base 70E. The platform 70 includes a plurality of fillers 74 that define portions of the flanges 70B, such as filler 74-3. Filler 74-2 is dimensioned to extend along and outwardly from the platform base 70E to define at least one of the flanges 70B. FIG. 5 illustrates a perspective view of the fillers 74-1, 74-2, 74-3 for illustrative purposes. It should be appreciated that the specific geometry of each filler 74 can be dimensioned according to a geometry of the platform 70.

Referring to FIGS. 6-7, with continuing reference to FIG. 4, adjacent layers L can be arranged to define one or more contours of the platform 70. For example, the layers L can curve inwardly and/or outwardly from adjacent layers L. The geometry of the layers L can cause a cross section or perimeter of the respective internal cavity 70D to taper, as illustrated by the internal cavities 70D associated with filler 74-1 at junctions J1, J2 and J3. Some of the layers L may arranged to have a relatively large turning radii along the respective contour such that the internal cavities 70D associated with fillers 74-1, 74-2 have a generally deltoid or delta-shaped geometry formed by inner radii, for example. The fillers 74 can be utilized to maintain a geometry of the platform 70 during layup of the layers L, which can improve the structural capability and manufacturability of the layers L.

Various materials can be utilized for the fillers 74. In the illustrative examples of FIGS. 6-7, the fillers 74-1 and 74-2 include a composite structure 76-1 and 76-2, respectively, situated in internal cavities 70D adjacent the platform base 70E. In other examples, the fillers 74-1 and 74-2 are constructed from uni-tape plies, discontinuous chopped fibers in a resin matrix, preforms made of a bulk or sheet molding compound, and/or thermoplastics.

The filler 74-3 includes a stacked composite structure 76-3 situated in one of the internal cavities 70D spaced furthest from the platform base 70E and in the flanges 70B. The filler 74-3 is dimensioned to extend between surfaces of the composite layers L that bound the respective internal cavity 70D. The stacked composite structure 76-3 can provide structural support and rigidity to the adjacent layers L and distribute structural loads across portions of the platform 70. The stacked structure 76-3 includes a multitude of layers formed from discontinuous material sheets that are bonded together by an adhesive or resin material. Because the stacked structure 76-3 is formed from separate layers, a bond line is formed between adjacent layers.

The filler 74-3 also includes an overwrap ply 76A that surrounds the stacked composite structure 76-3. The overwrap ply 76A can be bonded to the stacked composite structure 76-3 with an adhesive or through resin. In the illustrated example, the overwrap ply 76A includes a single layer or ply of composite material that encloses or abuts lateral edges of each layer in the stacked composite structure 76-3 on a first side and one of the layers L on a second opposite side. Because the overwrap ply 76A is a single layer, it defines a butt joint with a discontinuity that forms an opening into the stacked composite structure 76-3. Alternatively, if the overwrap ply 76A included multiple layers, there would still be a butt joint or opening into the stacked composite structure 76-3

One feature of the overwrap ply 76A is reduced crack propagation through the filler 74-3. In particular, if a crack formed between adjacent layers of the stacked composite structure 76-3, the overwrap ply 76A would prevent the crack from reaching a surface of the filler 74-3 and therefore would improve the strength and longevity of the filler 74-3 as well as the platform 70.

Furthermore, in the illustrated example of FIGS. 4 and 6-7, each of the fillers 74-3 in the flanges 70-B includes a bushing 73. The stacked composite structure 76-3 supports the bushing 73 such that the filler 74-3 serves to provide a structural load path between the bushing 73 and composite layers L.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. An assembly for a gas turbine engine comprising:
an airfoil including an airfoil section extending from a root section, the airfoil section extending between a leading edge and a trailing edge in a chordwise direction and extending between a tip portion and the root section in a radial direction, and the airfoil section defining a pressure side and a suction side separated in a thickness direction; and
a platform dimensioned to receive a retention pin to mount the platform to a rotatable hub;
wherein the platform comprises:
a plurality of composite layers including a first composite layer defining a base of the platform and a second composite layer that extends from the first composite layer and partially defines an internal cavity and a plurality of flanges, wherein the internal cavity and the plurality of flanges are spaced from the first composite layer;

a filler including a stacked composite structure in the internal cavity that extends between the plurality of composite layers;

wherein the plurality of composite layers includes a first set of ply layers that define a base of the platform, a second set of ply layers that extends from opposing circumferential edges of the first set of ply layers, and a third set of ply layers in abutment with the first and second set of ply layers;

wherein the second and third sets of ply layers define the internal cavity;

wherein the third set of ply layers define a perimeter of a hollow cavity;

wherein the stacked composite structure in the filler includes multitude composite layers arranged in parallel planes and the parallel planes extend between lateral edges of the plurality of composite layers in the stacked composite structure; and wherein the multitude of composite layers of the stacked composite structure are surrounded by an overwrap ply and the overwrap ply is spaced from the airfoil.

2. The assembly of claim 1, wherein the overwrap ply is bonded to lateral edges of the multitude of composite layers of the stacked composite structure.

3. The assembly of claim 2, wherein the overwrap ply includes a single layer defining a butt joint with a discontinuity in the overwrap ply to form an opening to the stacked composite structure.

4. The assembly as recited in claim 1, wherein the plurality of composite layers is formed from discontinuous fiber material sheets.

5. The assembly as recited in claim 1, further comprising bond lines between adjacent layers of the first, second, and third set of ply layers.

6. The assembly as recited in claim 1, wherein the platform includes a bushing in the internal cavity, the bushing is dimensioned to receive the retention pin, and the stacked composite structure abuts the bushing to transfer loads to the plurality of composite layers that bound the internal cavity.

7. The assembly as recited in claim 6, wherein the hollow cavity is located between the first set of ply layers and the internal cavity and a bushing opening for accepting the bushing creates discontinuities in the stacked composite structure.

8. The assembly as recited in claim 1, wherein:
the plurality of composite layers is arranged such that a cross section of the internal cavity has a deltoid shaped geometry;
the internal cavity is defined in the root section;
the stacked composite structure is machined to form discontinuities in the stacked composite structure that abut a bushing; and
a perimeter of the internal cavity tapers towards the tip portion and includes a curved profile that matches a curved profile of the adjacent hollow cavity.

9. The assembly of claim 1, further comprising a plurality of flanges at least partially defined by the second and third ply layers and the plurality of flanges are spaced from the first ply layer.

10. A platform for a gas turbine engine comprising:
a platform body defining one or more slots between a plurality of flanges, the one or more slots dimensioned to receive a respective flange of a hub, and the platform body including a plurality of composite layers that join together to define an internal cavity; and a filler including a stacked composite structure having a multitude of composite layers in the internal cavity and the filler extends between the plurality of composite layers;

wherein the plurality of composite layers includes a first set of ply layers that define a base of the platform, a second set of ply layer that extends from opposing circumferential edges of the first set of ply layers, and a third set of ply layers in abutment with the first and second set of ply layers and the plurality of flanges are spaced from the first ply layer;

wherein the second and third sets of ply layers define the internal cavity;

wherein the multitude of composite layers in the stacked composite structure are arranged in parallel planes and the parallel planes extend between lateral edges of the plurality of composite layers in the stacked composite structure and the multitude of composite layers of the stacked composite structure are formed from discontinuous fiber material sheets;

wherein the multitude of composite layers are surrounded by an overwrap ply;

wherein the overwrap ply is bonded to the multitude of composite layers and follows a contour of the internal cavity on a first side and abuts the stacked composite structure on a second opposite side; and wherein the overwrap ply includes a single layer defining a butt joint with a discontinuity in the overwrap ply to form an opening to the stacked composite structure.

11. The platform as recited in claim 10, further comprising a bushing opening in the filler for accepting a bushing, wherein the bushing opening creates discontinuities in the multitude of composite layers in the stacked structure and the bushing is dimensioned to receive a retention pin, and the stacked composite structure abuts the bushing to transfer loads to the plurality of composite layers that bound the internal cavity.

12. The platform as recited in claim 10, wherein the first set of ply layers extends between adjacent airfoils, the second set of ply layers extends from the first set of ply layers to define the plurality of flanges, and the third set of ply layers abut against the first and second layers to partially surround the internal cavity that extends through the plurality of flanges.

13. The platform as recited in claim 10, further comprising bond lines between adjacent layers of the first, second, and third set of ply layers.

14. A gas turbine engine comprising:
a fan section;
a compressor section;
a turbine section that drives the fan section and the compressor section; and
a rotor assembly comprising:
a hub rotatable about an engine longitudinal axis, the hub including a plurality of flanges;
an array of airfoils circumferentially distributed about an outer periphery of the hub, each one of the airfoils including an airfoil section extending from a root section mounted to the hub;
an array of platforms mechanically attached to the hub, each of the platforms including one or more slots defined by a plurality of flanges, the one or more slots dimensioned to receive a respective one of the flanges of the hub;

a plurality of retention pins, each one of the retention pins extending through the flanges of the hub and through the plurality of flanges of a respective one of the platforms to mechanically attach the respective one of the platforms to the hub; and a plurality of fillers each including a stacked composite structure in a corresponding one of a plurality of internal cavities in a respective one of the platforms, each of the internal cavities are entirely bounded by one or more composite layers;

wherein the stacked composite structure includes a multitude of composite layers formed from discontinuous fiber material sheets and surrounded by an overwrap ply; and wherein a bushing opening in the stacked composite structure creates discontinuities in the multitude of composite layers.

15. The gas turbine engine as recited in claim 14, wherein:
the root section comprises a plurality of composite layers including a first set of ply layers that define a base of the platform, a second set of ply layer that extends from opposing circumferential edges of the first set of ply layers, and a third set of ply layers in abutment with the first and second set of ply layers;
the plurality of flanges is spaced from the first ply layer the second and third sets of ply layers define each of the internal cavities; and
adjacent layers of the first, second, and third set of ply layers are connected at bond lines.

16. The gas turbine engine of claim 14, wherein the overwrap ply is bonded to lateral edges of the multitude of composite layers of the stacked composite structure and the overwrap ply includes a single layer defining a butt joint with a discontinuity in the overwrap ply to form an opening to the stacked composite structure.

* * * * *